June 5, 1923.

E. PEYER

DEVICE FOR INSERTING SCREWS

Filed March 2, 1921

1,457,457

Inventor
Emil Peyer
By B. Singer, Atty.

Patented June 5, 1923.

1,457,457

UNITED STATES PATENT OFFICE.

EMIL PEYER, OF WANGEN, SWITZERLAND, ASSIGNOR TO THE FIRM WALDER & CO., OF BRUTISELLEN, ZURICH, SWITZERLAND.

DEVICE FOR INSERTING SCREWS.

Application filed March 2, 1921. Serial No. 449,076.

*To all whom it may concern:*

Be it known that I, EMIL PEYER, a citizen of the Swiss Confederation, residing at Wangen, Canton Zurich, Switzerland, have invented new and useful Improvements in a Device for Inserting Screws, of which the following is a specification.

The present invention relates to a new and improved device for inserting wood screws at places which are not easily accessible for screw drivers and more particularly the invention relates to machines for screwing wooden heels on to the soles of boots.

One object of the invention is to provide an improved device which shall be simple, strong and durable in construction and efficient in use. Another object of the invention consists in the provision of a device which may be attached to all of the best known drilling machines and the like.

Other objects of the invention relates to the provision of minor parts and to details of construction, all of which will be more clearly set forth in the following specification.

With the above objects in view the invention resides in the parts and combination of parts hereinafter described and particularly set forth in the claims appended hereto.

In order that my invention may be clearly understood I have illustrated the same in the accompanying drawings, wherein.

Figure 1:
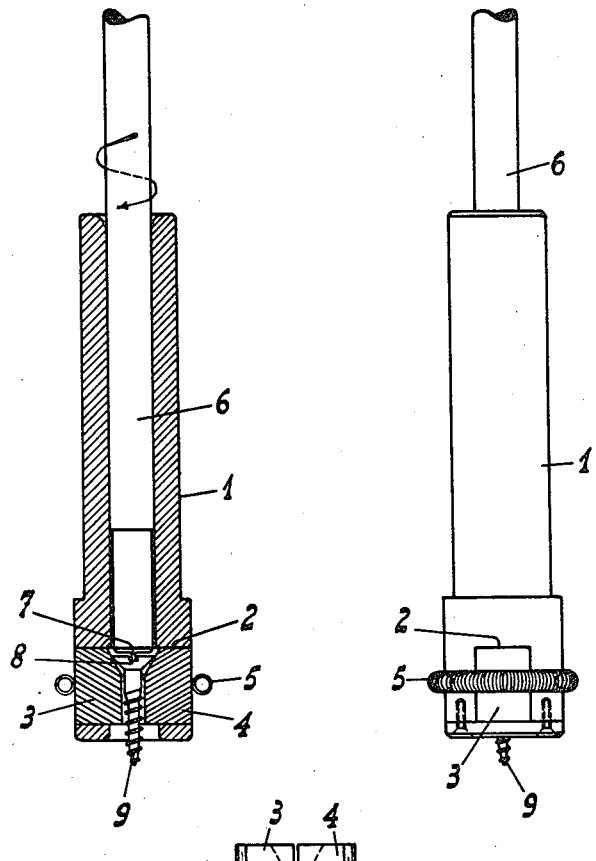
Fig. 1 shows a sectional elevation of the device
Figure 2:
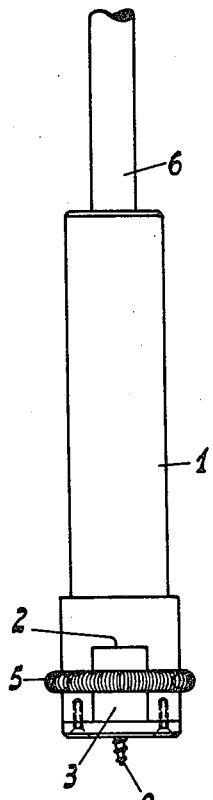
Fig. 2 is a side elevation
Figure 3:
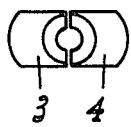
Fig. 3 shows in a side view a chuck for gripping a wood screw
Figure 4:
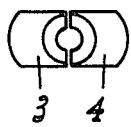
Fig. 4 is a top view to Fig. 3.

Referring to the drawing, 1 indicates a sleeve having a central bore passing quite through. Near the lower end of the sleeve a cross-slot 2 is provided which is covered at one side by a face plate rigidly screwed on to the sleeve 1. In said slot 2 two jaws 3, 4 are arranged the jaws have a sliding fit and their adjacent faces have notches adapted to receive a wood-screw 9 as shown in Fig. 1. The jaws 3, 4 are pressed against each other by a coiled spring 5 the ends of which being connected with each other. The spring 5 has the tendency to contract and presses thereby the jaws 3, 4 against each other. The jaws 3, 4 form a yielding support for the wood screw 9. In the bore of the sleeve 1 a shaft 6 is rotatably mounted, the lower face of said shaft is provided with a screw-driver 7 fitting the groove 8 of the screw 9.

In operation the shaft 6 is connected to a rotating shaft of a drilling machine and the sleeve 1 is fastened to a stationary part thereof or may be held fast by hand. The screw 9 is brought in the position shown in Fig. 1 and the parts which are to be screwed together are pressed by some suitable device against the screw 9. The shaft 6 while rotating imparts its movement to the screw 9 and the latter enters the heel, etc., which is to be screwed on to the sole. The conical head of screw 9 forces the jaws 3, 4 apart against the action of spring 5, the jaws 3, 4 form a guide for said screw and insure a correct position of the same in the boot. After the screw 9 is screwed in the jaws 3, 4 return automatically into their original position.

Further improvement of the device consists in the arrangement of an automatic feeding device for screws by means of which screws are fed one by one between the jaws.

The sleeve 1 may be removed and a drill with countersink may be attached thereto to use the said shaft 6 for drilling and countersinking holes which have to receive the screws 9.

While I have shown and described the preferred construction of the new device I wish to point out that various changes in form and construction may be made without departing from the spirit of the invention.

What I claim and wish to secure by Letters Patent is:

In combination with a rotary screw-driving shaft, a sleeve having a longitudinal bore to receive said shaft and also having a transverse slot, near the outer end, intersecting said bore, jaws slidably mounted in said slot and having a screw-receiving bore in their opposing ends, formed partly in each of them, said bore having at the end next the opposing end of said shaft a conical counterbore to receive the head of a screw and presenting cam surfaces to coact with the head of the screw and move said jaws outwardly as the screw is driven by the shaft, and a spring pressing said jaws toward each other.

In witness whereof I affix my signature.

EMIL PEYER.